US00RE41314E

(19) United States
(12) Reissued Patent
Kuma et al.

(10) Patent Number: US RE41,314 E
(45) Date of Reissued Patent: May 4, 2010

(54) GAS ADSORBING ELEMENT AND METHOD FOR FORMING SAME

(75) Inventors: Toshimi Kuma, Fukuoka (JP); Chieko Kuma, legal representative, Fukuoka (JP)

(73) Assignee: Kabushiki Kaisha Seibu Giken, Fukuoka (JP)

(21) Appl. No.: 10/374,604

(22) PCT Filed: Apr. 30, 1991

(86) PCT No.: PCT/JP91/00592

§ 371 (c)(1), (2), (4) Date: Jul. 14, 1992

(87) PCT Pub. No.: WO91/16971

PCT Pub. Date: Nov. 14, 1991

Related U.S. Patent Documents

Reissue of:
(64) Patent No.: 5,348,922
Issued: Sep. 20, 1994
Appl. No.: 07/793,372
Filed: Jul. 14, 1992

U.S. Applications:
(63) Continuation of application No. 09/433,272, filed on Nov. 3, 1999, now abandoned.

(30) Foreign Application Priority Data

May 2, 1990 (JP) ..... 2-116632

(51) Int. Cl.
*B01J 29/06* (2006.01)
*B01D 47/00* (2006.01)
*B01D 53/46* (2006.01)

(52) U.S. Cl. ..... 502/60; 502/63; 502/64; 502/71; 502/77; 502/79; 423/239.2; 423/210

(58) Field of Classification Search ..... 423/239.2, 423/210; 502/60, 63, 64, 71, 77, 79
See application file for complete search history.

(56) References Cited

U.S. PATENT DOCUMENTS 3,033,642 A * 5/1962 Bukata et al.
4,012,206 A * 3/1977 Macriss et al.
5,017,538 A * 5/1991 Takeshima
5,244,852 A * 9/1993 Lachman et al.
6,022,519 A * 2/2000 Shimizu et al.
6,039,864 A * 3/2000 Mohr et al.

FOREIGN PATENT DOCUMENTS

| | | | |
|---|---|---|---|
| EP | 0 003 818 | * | 9/1979 |
| JP | 54-19548 | * | 2/1979 |
| JP | 59-15028 | * | 4/1984 |
| JP | 1-168311 | * | 7/1989 |
| WO | 88-02659 | * | 4/1998 |

OTHER PUBLICATIONS

"Inorganic Silicon Compounds as Fine Chemicals", Shigekazu UDAGAWA et al., p. 285, 1982.*

"Hydrofoba adsorbenter ger nya möjligheter", *Kemisk Tidskrift,* 1987 NR 7, pp. 40–44.*

International Zeolite Association, "Atlas of Zeolite Structure Types" internet version (no date available).*

* cited by examiner

*Primary Examiner*—Elizabeth D Wood
(74) *Attorney, Agent, or Firm*—Staas & Halsey LLP

(57) ABSTRACT

A gas adsorbing element is formed into a honeycomb-shaped laminate having many small channels penetrating from one end surface to the other and in which hydrophobic high silica zeolite powder is exposed on the walls of the small channels. The hydrophobic high silica zeolite is, for example, a zeolite which is produced by removing most of the aluminum component from an ordinary zeolite. In forming the honeycomb-shaped laminate, it is favorable that non-flammable sheets are laminated and the laminate is impregnated with a dispersion of high silica zeolite powder and with an inorganic binder, and that the high silica zeolite powder is fixed in fiber gaps and on the surface of the non-flammable paper. It is desirable that the non-flammable sheet is a low density inorganic fiber paper and is baked either before or after forming the honeycomb-shaped laminate. This element adsorbs little water vapor even when the process air is highly humid, and is able to adsorb and remove organic solvent vapor and bad odor material in the air with high efficiency.

13 Claims, 6 Drawing Sheets

GAS ADSORBING ELEMENT AND METHOD FOR FORMING SAME

Matter enclosed in heavy brackets [ ] appears in the original patent but forms no part of this reissue specification; matter printed in italics indicates the additions made by reissue.

*This application is a continuation application of application Ser. No. 09/433,272, filed Nov. 3, 1999, now abandoned, which was a reissue application of U.S. Pat. No. 5,348,922.*

BACKGROUND OF THE INVENTION

1. Field of the Invention

The present invention relates to a gas adsorbing element which selectively adsorbs and removes active gases contained in inert gases such as air, especially harmful gases such as organic solvent vapor, bad odor material, etc., to obtain clean inert gases such as air.

2. Description of the Prior Art

Zeolite is a molecular sieve and is used as an adsorbent because it mainly consists of aluminosilicate. Zeolite also selectively adsorbs water and other gas molecules such as organic solvent vapor, in accordance with the diameter of the molecules, making good use of the difference in diameters of micropores which are formed by elimination of crystal water.

A rotative reactivation type dehumidifier element has been proposed in Japanese Patent Publication No. 19548/1979 (laid open to the public without examination) which consists of a corrugated and laminated cylindrical honeycomb-structure made of sheets of asbestos paper, glass fiber paper, and etc., with a molecular sieve, for example, 4A, 13X, etc., attached to it. Also in Japanese Patent Publication No. 240921/1988 (laid open to the public without examination) a honeycomb-structure dehumidifier element is proposed which is made by adding a binding agent to synthetic zeolite powder of, for example, A type, X type, Y type, or natural zeolite powder such as mordenite and formed, for example, by extruding, press forming, or some other similar method. On the other hand, a honeycomb-structure element is proposed in Japanese Patent Publication No. 50068/1978 (laid open to the public without examination) as a rotative adsorbing element that adsorbs and separates organic solvent vapor, bad odor gas and other gases from the air. The honeycomb-structure element set forth in this publication is made of paper containing fibrous active carbon.

The above mentioned zeolite is able to selectively adsorb gas molecules in accordance with its molecular diameter. In adsorbing/separating organic solvent vapor, bad odor gases and other gases from the air, water vapor is always adsorbed together with organic solvent vapor, bad odor gas and other gases because there is always water vapor coexisting with the air. The molecular diameter of water is 2.8 Å. The molecular diameter or organic solvents or bad odor gases are all larger than that of water. For example, the molecular diameter of benzene is 6.7 Å, that of cyclohexane is 6.1 Å, etc. Therefore, zeolite can adsorb and separate water only but not organic solvent vapor or bad odor gas. Rather, water vapor is preferentially adsorbed and adsorption of organic solvent vapor or bad odor gas is obstructed by the adsorbed water molecules. Therefore, when the absolute humidity of process air is high, zeolite cannot efficiently adsorb and separate organic solvent vapor or bad odor material.

Active carbon is a hydrophobic adsorbent and preferentially adsorbs non-polar molecules such as hydrocarbon. However, it is flammable and has a danger of catching fire when hot air about 130° C. is used for reactivation. Also some types of adsorbed solvent generate high adsorption heat and the adsorbing element has a danger of catching fire. Thus, it is extremely difficult to use. Moreover, the adsorbing capability of the element decreases by the adsorption of oil. After being used for a certain period of time, regeneration of the element at a high temperature of approximately 300° C. is necessary. This active carbon element, however, has a defect such that during high temperature regeneration hot air cannot be used; rather, superheated water vapor should be used for regeneration.

SUMMARY OF THE INVENTION

In the present invention, a gas adsorbing element is provided in which zeolite is used as an adsorbent having a high silica content to impart a hydrophobic property, and which is formed into a block, i.e., a honeycomb-shaped laminate, having many small channels penetrating from one end surface to the other. The high silica zeolite is exposed on the surface of the small channels. The gas adsorbing element of the present invention does not adsorb vapor in inert gases such as air which contain water vapor and organic solvent vapor and/or bad odor material, and has the ability to efficiently adsorb the organic solvent vapor and the bad odor material.

The composition of zeolite is generally shown as $xM_2/nO.Al_2O_3.ySiO_2.zH_2O$ (here M is an alkali metal or alkaline-earth metal, n is its valence and $y \geqq 1$ , y is usually 1~10). For example, the adsorbent 'Zeolum A-4' manufactured by Toyo Soda Co., Ltd., which is a 4A type zeolite, has a composition of $1.0 \pm 0.2\ Na_2O.Al_2O_3.1.85 \pm 0.5SiO_2.zH_2O$. When high silica zeolite having a high silica content so that y is above approximately 8, is used, it obtains a hydrophobic property. That is, it has a decreased ability to adsorb highly polar materials such as water molecules, and an increased ability to adsorb non-polar or low polar materials such as organic solvent vapor and bad odor materials.

There are methods of obtaining high silica zeolite having a hydrophobic property. A prior art method includes de-aluminizing a typical zeolite having a y of 1–6. Another method is a direct synthesis from a $Na_2O—Al_2O_3—SiO_2—H_2O$ composition. In the prior art de-aluminizing methods, there include:

(1) a method in which erionite of y=3, mordenite of y=5 or L zeolite of y=6, etc., is soaked in mineral acid and heated;

(2) a method in which a Y type zeolite of y=3~6 or mordenite of y=5, etc., is heat treated in the presence of phosgene gas;

(3) a method in which a Y type zeolite of $M=NH_4$ or H and y=3~6 is baked preferably in the co-existence of steam; and (4) a method in which an A type zeolite of y=2, an X type zeolite of y=2~3 or a Y type zeolite of y=3~6, etc., is brought into contact with silicon tetrachloride at a high temperature and aluminum in zeolite is partially substituted with silicon by the reaction of $SiCl_4 + Al_2O_3 \rightarrow SiO_2 + AlCl_3$.

For high silica zeolite having a hydrophobic property which can be used in the present invention the value of y should be roughly above 8. Of course, in either method mentioned above, it is necessary as an indispensable condition of a molecular sieve that micropores having a diameter larger than approximately 3 Å are maintained.

In the present invention, a gas adsorbing element is formed into a block having many small channels penetrating from one end surface to the other, i.e., a honeycomb structure, so that the above-mentioned high silica zeolite having a hydrophobic property efficiently adsorbs and separates organic solvent vapor and bad odor material. For forming the honey-comb structure into a block there is a method, for example, in which the above-mentioned high silica zeolite is mixed with inorganic binder such as kaolinite and is formed into a honeycomb structure by extruding, press forming, etc. There is another method in which a sheet carrier such as paper or cloth is formed into a honeycomb block and high silica zeolite powder is bound on and in the sheet carrier with an inorganic binder either before or after the formation of the block. In the latter method the contacting area of high silica zeolite with process gas is larger and is utilized more efficiently. A porous sheet formed of fibers such as paper, cloth and non-woven fabrics are preferable as a sheet carrier than one with a smooth surface and without a permeating property such as a metal sheet and a plastic sheet. This is because high silica zeolite is carried not only on the sheet surface but also in the fiber gaps. Especially bulky sheets of fibers having a high aperture rate are desirable. During gas adsorption, desorption/reactivation is necessary. For desorption, a pressure swing method which does not need heating can be used, but desorption/reactivation by heating can be performed more easily and with simpler equipment. For heating reactivation, the element should be heat resistant and nonflammable, and therefore inorganic fiber papers are used which have no danger of catching fire. These inorganic fiber papers include paper formed from ceramic fibers, rock fibers, slag fibers, or glass fibers, or paper mainly consisting of a mixture of these fibers. The use of asbestos fiber, which is also an inorganic fiber and does not pose a danger of catching fire, is not preferable because asbestos is harmful to the health of humans.

Further, in a suitable step of manufacturing a gas adsorbing element using the above-mentioned paper including mainly inorganic fibers, the paper is baked to burn and the small amount of organic ingredients contained therein are removed. There is also a method which uses a nonflammable paper made by mixing high silica zeolite powder.

It is preferable that in the honeycomb-structure the wavelength 1 is 2.5 to 4.5 mm and the wave height h is 1.0 to 3.0 mm. When these sizes are too large, the total surface area of the gas adsorbing element becomes smaller. Consequently, the efficiency of gas adsorption drops. In contrast, when these sizes are too small, pressure drops in the process air and the reactivation air become large, and subsequently an economical operation is not possible.

DESCRIPTION OF THE PREFERRED EMBODIMENTS

Figure 1:
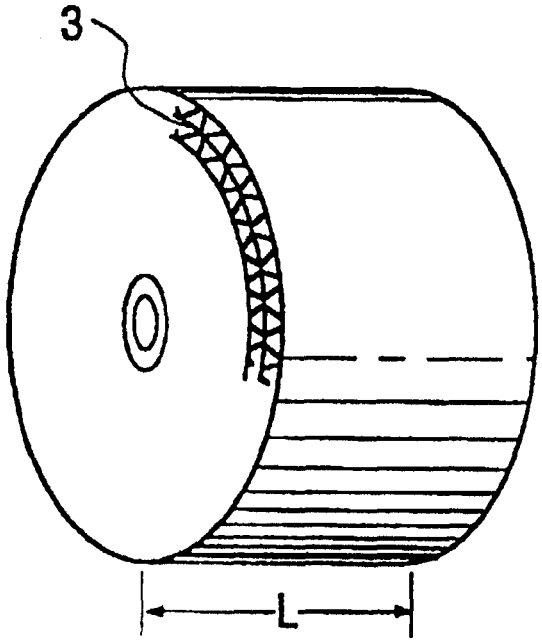
FIG. 1 is a perspective view of a gas adsorbing element according to the present invention.
Figure 2:
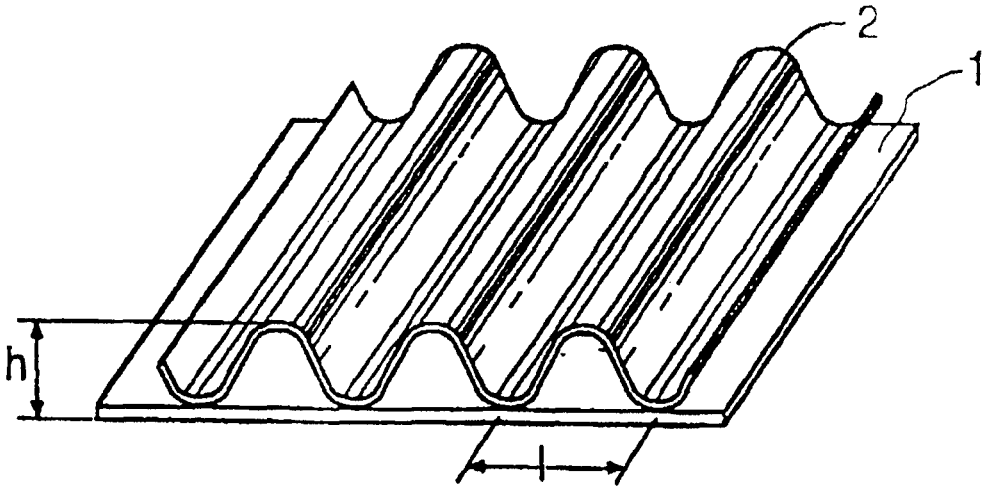
FIG. 2 is a perspective view of a single-faced corrugated sheet.

A small amount of organic synthetic fiber and a small amount of an inorganic or organic binder were added to ceramic fiber of silica alumina series to prepare low density paper having an apparent specific gravity of approximately 0.3~0.45 (about 60–150 g/m$^2$ weight) and a thickness of approximately 0.10~0.30 mm. The paper was then corrugated so that it had a width of 400 mm, a wavelength of 3.4 mm and a wave height of 1.8 mm. Using an adhesive including a mixture of synthetic resin such as polyvinyl acetate and inorganic binder, a flat paper 1 and a corrugated paper 2 were bonded together at all ridged portions of the corrugated paper 2 as shown in FIG. 2 to obtain a single-faced corrugated sheet. The corrugated sheet was wound around a core material as shown in FIG. 1 and formed into a honeycomb-shaped laminate having a cylindrical shape having a diameter of 320 mm and having many small channels 3 penetrating from one end surface to the other. Zeolite of $xNa_2O.Al_2O_3.ySiO_2.zH_2O$ (here x[≈]≅1, y[≈]≅200, z[≈]≅9 and having a micropore diameter of approximately 10 Å), such as DAY Zeolite manufactured by Degussa Aktiengesellschaft of the Federal Republic of Germany was used as the high silica zeolite. This zeolite is obtained by treating NaY zeolite, i.e., $xNa_2O.Al_2O_3.ySiO_2.zH_2O$ (here x[≈]≅1, y[≈]≅5, z[≈]≅9 and having a micropore diameter of approximately 10 Å) with silicon tetrachloride and partially substituting the [$Al_2O_3$] $Al_2O_3$ contained therein with $SiO_2$. The zeolite was finely pulverized and dispersed in hydrosol of [either] silica [or alumina]. The above-mentioned cylindrically formed body was soaked in sol to make the high silica zeolite adhere in fiber apertures of and on the surface of the inorganic fiber papers 1 and 2 with fine particles of silica [or alumina] in the hydrosol as a binding agent. The element was dried and then baked for 3~4 hours at 450° C. to remove organic materials in the sheet and to dehydrate the zeolite and thus obtain a gas adsorbing element. The rate of high silica zeolite attached to the inorganic fiber paper is approximately 35 wt. %. This baking may occur before the impregnation of zeolite.

Figure 3:
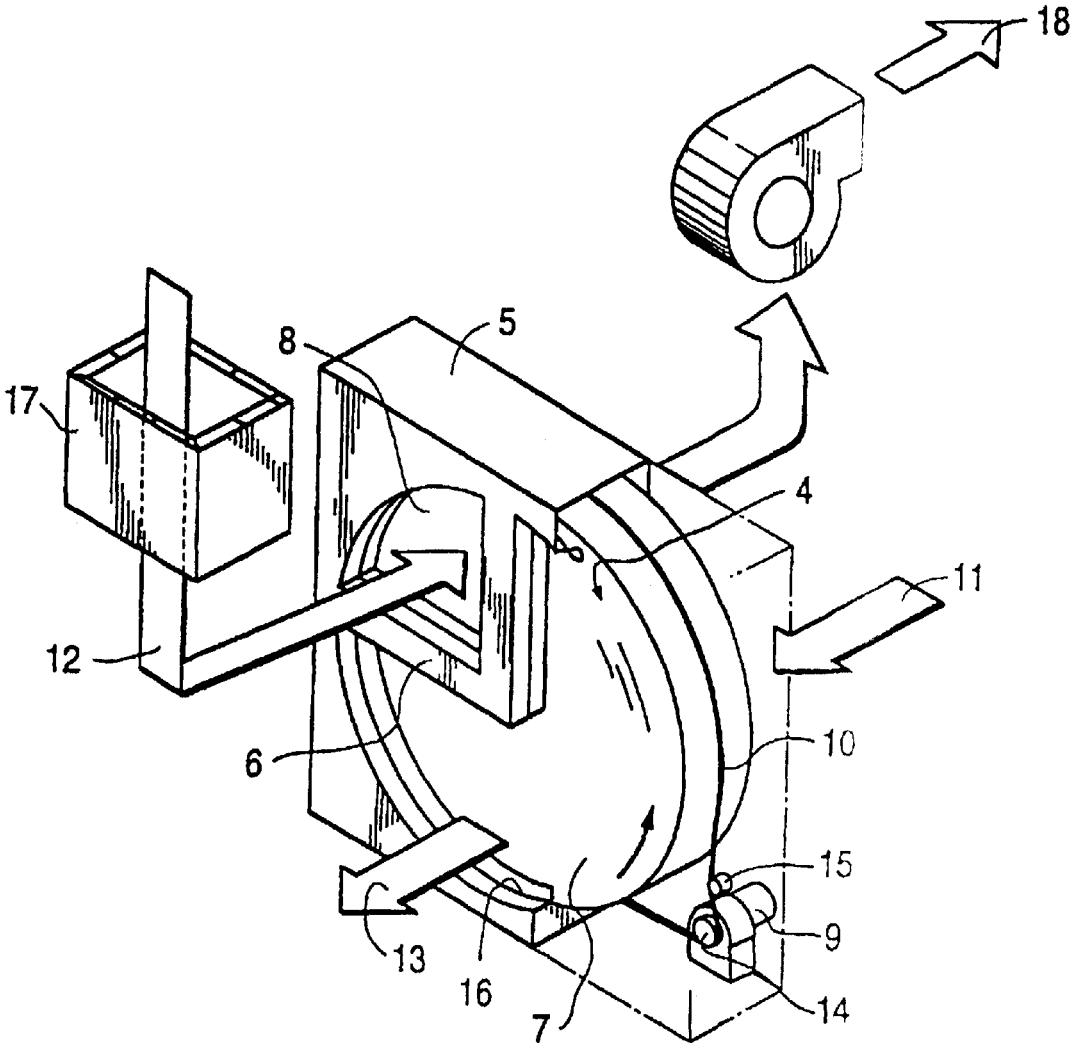
FIG. 3 is a perspective view of an example of a gas adsorbing and concentrating apparatus, a portion being broken away for the purpose of illustration.

FIG. 3 is a gas adsorbing apparatus using a cylindrical gas adsorbing element shown in FIG. 1. In FIG. 3, 4 is a gas adsorbing element, 5 is a casing, 6 is a separator, 7 is a process zone, 8 is a reactivating zone, 9 is a geared motor, 10 is a driving belt, 11 is process air and 12 is reactivation air. The gas adsorbing element 4 is held rotatably in the casing 5 which is separated by the separator 6 into the process (gas adsorbing) zone 7 and the reactivating zone 8. The element 4 is rotated by the geared motor 9 and the driving belt 10. The process air 11 is input to the process zone 7 and hot reactivation air 12 is input to the reactivating zone 8 to adsorb active ingredients in the process air 11 such as organic solvent vapor and bad odor materials to obtain clean air 13. In addition, in FIG. 3, 14 is a pulley, 15 is a tension pulley, 16 is a rubber seal and 17 is a reactivation air heater.

Figure 4:
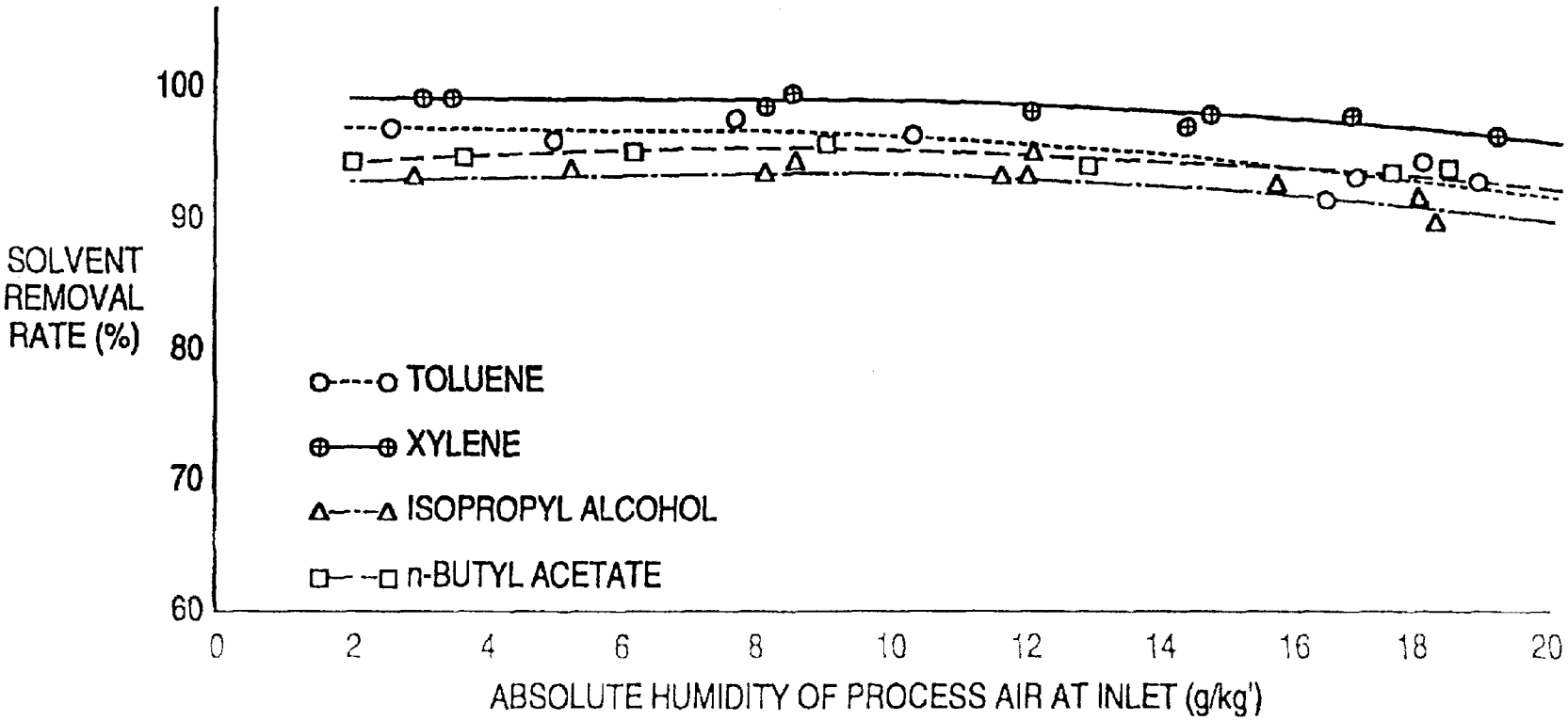
FIG. 4 is a graph showing a change in the efficiency of the gas adsorbing element of the present invention due to a change in process air humidity at the inlet.

FIG. 4 is a graph of the solvent removal rate (%) when the cylindrical length of the element 4 is 400 mm, the rotating speed is 10 r.p.h., the ratio of reactivation air volume to process air volume is 1:10, the process air temperature at the inlet is 25° C. ±2° C., the velocity of process air and reacti vation air is 2 m/sec. and the reactivation air temperature at the inlet is 150° C.±2° C. Process air is passed as follows:

air containing 550 ppm of toluene air containing 1100 ppm of xylene air containing 760 ppm of isopropyl alcohol air containing 340 ppm of n-butyl acetate each having an absolute humidity of 2~19 g/kg.

Solvent removal rate in this instance means the value obtained by subtracting the quotient, which is obtained by dividing the solvent containing rate of process air at the outlet by that of process air at each inlet, from 1. Even when the solvent concentration in process air at the inlet changes, the solvent removal rate hardly changes.

Figure 5:
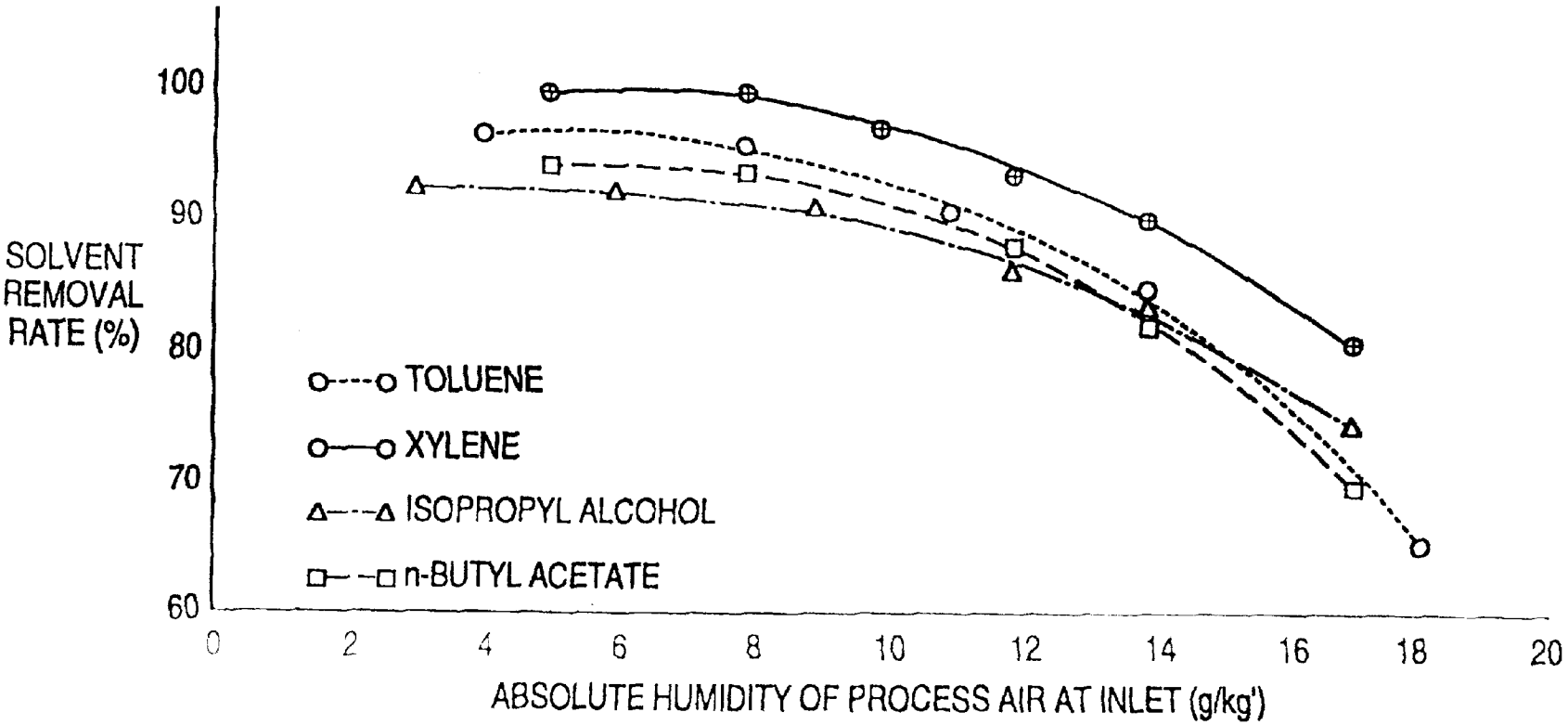
FIG. 5 is a graph showing a change in the efficiency of the gas adsorbing element of a contrasting example due to a change in process air humidity at the inlet.

As a contrasting example, FIG. 5 shows the result of a similar test, i.e., the solvent removal rate of a gas adsorbing element manufactured in the same conditions as the above example using, for example, 'Zeolum F-9' (having a micropore diameter of 10 Å) manufactured by Toyo Soda Co., Ltd., which is a hydrophilic zeolite on the market. As is clear from FIG. 5, with a hydrophilic zeolite, solvent removal rates for all organic solvents are above 90% when absolute humidity of process air at the element inlet is roughly below 8 g/kg'. When absolute humidity of process air at the inlet becomes higher than 8 g/kg' the solvent removal rate rapidly decreases. This is because the used zeolite is hydrophilic and preferentially adsorbs water vapor in the air rather than organic solvent vapor. On the other hand, in the present invention, when high silica zeolite is used, solvent removal rates for all organic solvents tested were above 90% regardless of the absolute humidity of process air at the inlet, as is clear from FIG. 4. Test conditions were variously changed. For example, the range of process air temperature at the inlet was between 5°~50° C., the air velocity was between 1~3 m/sec., the reactivation air temperature at the inlet was between 100°~160° C. and the organic solvent vapor concentration was between 20~2700 ppm, and the type of organic solvent was changed. In all cases, the solvent recovery rate was 90~100%. When the concentration of organic solvent vapor in the exhaust air 18 shown in FIG. 3 is high, it may be burnt or it may be used as fuel for a boiler.

Figure 6:
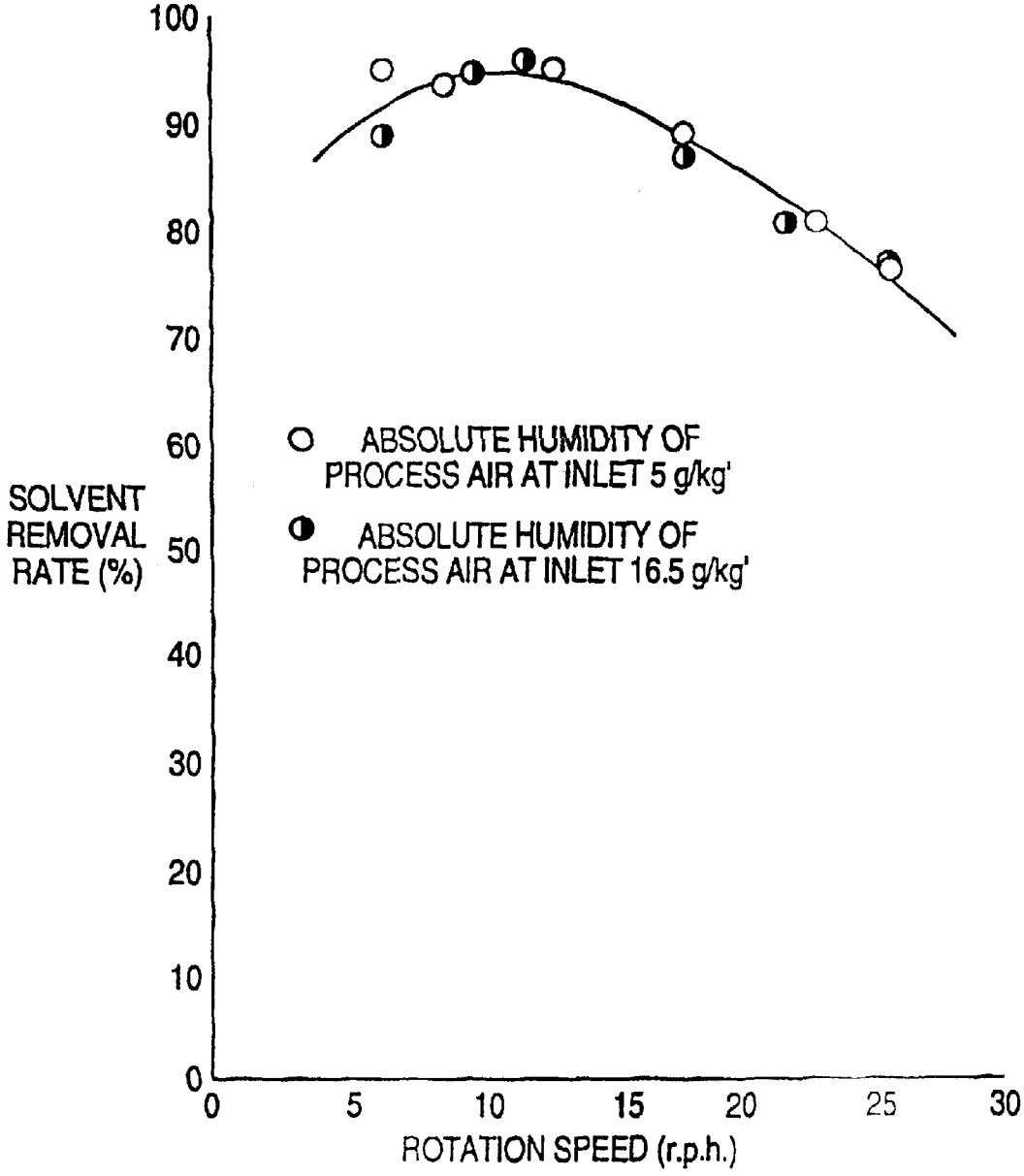
FIG. 6 is a graph showing a change in the efficiency of the gas adsorbing element of the present invention due to a change in element rotation speed.

In order to observe a change of solvent removal rate with the change of element rotation speed, an element obtained in the above example was put into the equipment of FIG. 3 and the toluene removal rate was measured under the conditions that process air temperature in the inlet was 15° C., process air and reactivation air velocity was 2 m/sec., reactivation air temperature at the inlet was 140° C., process air absolute humidities at the inlet were 5.0 g/kg (as identified by ◑) and 16.5 g/kg (as identified by ◑), and solvent vapor concentration in process air at the inlet was 500 ppm of toluene. Element rotation speed was varied in the range of 6~26 r.p.h. FIG. 6 is a graph of the result. From this, it can be seen that the solvent removal rate changes with a change in element rotation speed and that for the element used in this test the most appropriate rotation speed that gives the highest solvent removal rate is roughly 12 r.p.h.

In order to observe a change of solvent removal rate with a change of length of small channels, elements were prepared in which inorganic fiber paper having a thickness of 0.20 mm after impregnation with zeolite as in the above example was corrugated so that a wavelength was 3.4 mm and a wave height was 1.8 mm, and the length of the small channels L was changed from 100 mm to 500 mm. The prepared elements were then put into the equipment of FIG. 3. The equipment was then operated under the following conditions. The process air temperature at the inlet was 15° C., the reactivation air temperature at the inlet was 150° C., the process air velocity and reactivation air velocity were both 2 m/sec., the absolute humidity of process air at the inlet was 15 g/kg, the solvent vapor concentration in process air at the inlet was 1100 ppm of xylene and the rotation speed of the elements was 15 r.p.h.

Figure 7:
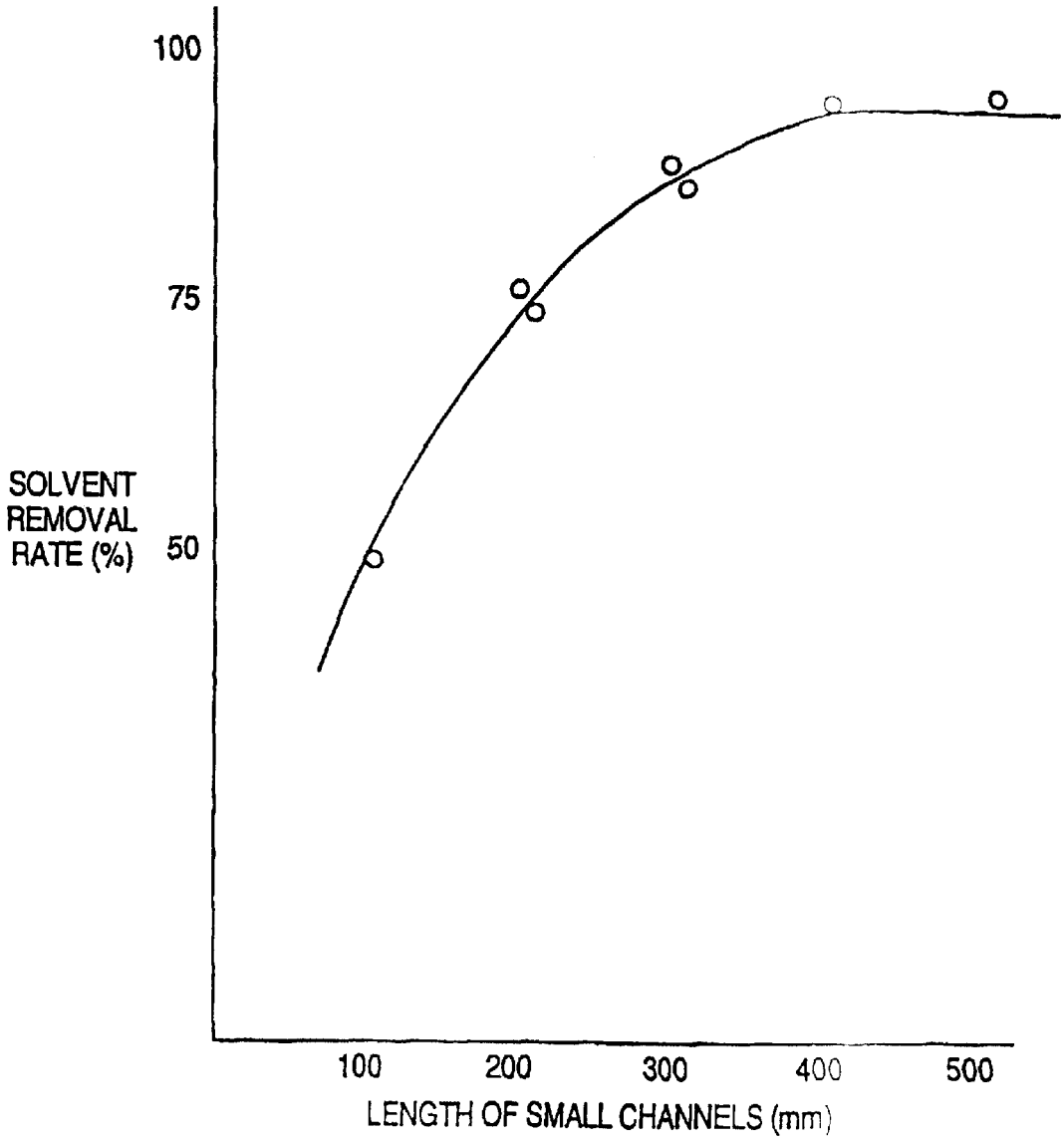
FIG. 7 is a graph showing a change in the efficiency of the gas adsorbing element of the present invention due to a change in the length of the small channels.

FIG. 7 is a graph of the xylene removal rate with respect to varying lengths of the small channels. From the graph of FIG. 7 it can be seen that in small channels having a length of 100 to 300 mm, the removal of solvent is not sufficient. In small channels having a length about approximately 400 mm, the solvent removal rate is above 95%. That is, removal of solvent is nearly total and, the use of small channels longer than approximately 400 mm is wasteful.

In the present invention, a gas adsorbing element manufactured as described above using hydrophobic high silica zeolite as an adsorbent, adsorbs a comparatively small amount of organic solvent vapor or bad odor component contained in an inert gas such as air, and adsorbs very little water vapor which is always in the air. Therefore, the gas adsorbing element of the present invention is capable of effectively adsorbing, concentrating, and removing organic solvent vapor or bad odor components contained in the inert gas such as air regardless of the humidity. Moreover, since an organic solvent or bad odor component adsorbed by the element can be mostly desorbed at a temperature of approximately 100°~160° C., the element is incorporated into a rotary reactivation type gas adsorbing equipment as shown, for example, in FIG. 3, to continuously adsorb, concentrate and burn to remove active gas contained in the inert gas such as air. When sheets mainly including an inorganic fiber are used for materials of the honeycomb-shaped laminate that carries high silica zeolite, the honeycomb-shaped laminate including the sheets and the high silica zeolite resists high temperature and avoids catching fire. This fireproof property is made more complete by baking non-flammable paper forming the element or the honeycomb-shaped laminate approximately 3~4 hours at 450° C. to remove, by decomposing or burning, the small amount of organic material contained in it. When the adsorbing performance of the element decreases due to the adhesion of oil mist of a high boiling point in the micropores of high silica zeolite, hot air of approximately 350° C. is passed through the element to remove the oil mist and to regenerate the element.

During the manufacturing process according to the present invention, a sheet of non-flammable paper, etc., is formed into a honeycomb shape, baking the honeycomb at 450°–500° C. and high silica zeolite powder is impregnated using an inorganic binder, etc., and adhered to it. This allows the process to proceed simply and economically without special machinery or equipment, and the majority of the high silica zeolite used in the gas adsorbing element works effectively as an adsorbent. When material consisting of fibers having many apertures such as non-flammable paper, particularly a low density inorganic fiber paper, is used as a carrier, high silica zeolite fixes not only on the surface of the inorganic fiber paper but also in the apertures between the fibers to increase the carrying ability of the element.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to as falling within the scope of the invention and the appended claims and their equivalents.

I claim:

1. A gas adsorbing [element] *device* comprising:

a honeycomb-shaped laminate having many small channels penetrating from a first end surface to a second end surface, including a hydrophobic high silica zeolite powder [placed] *fixed* on walls of said small channels, said high silica zeolite having the composition of $xM_2/_nO—Al_2O_3.ySiO_2.zH_2O$, where M is an alkaki metal or alkaline-earth metal, n is its valence, and y is a mol ratio of silica [and aluminum which] *to alumina and* is greater than approximately [8] *200, wherein*

*the honeycomb-shaped laminate has an adsorbing zone and a desorbing zone, such that the adsorbing and desorbing zones are repeatedly interchanged with one another.*

2. A gas adsorbing element according to claim 1, wherein high silica zeolite is zeolite from which most of an aluminum component is removed.

[3. A method of manufacturing a gas adsorbing element, comprising the steps of:

(a) laminating sheets having a main component of inorganic fiber to form single-faced corrugated sheets;

(b) laminating the single-faced corrugated sheets to form a honeycomb-shaped laminate having a shape of a gas adsorbing element having many small channels; and (c) fixing hydrophobic high silica zeolite powder in fiber gaps and on the wall of the small channels in which a mol ratio of silica and alumina is more than approximately 8:1 using an inorganic binder.]

[4. A method of manufacturing a gas adsorbing element according to claim 3, wherein high silica zeolite in said step (c) is zeolite from which most of an aluminum component is removed.]

[5. A method of manufacturing a gas adsorbing element according to claim 3, wherein the sheets in said step (a) are low density papers.]

[6. A method of manufacturing a gas adsorbing element according to claim 3, wherein the inorganic fiber paper in said step (a) is baked either before or after forming the honeycomb-shaped laminate.]

[7. A method of manufacturing a gas adsorbing element according to claim 3, wherein the thickness of the inorganic fiber sheet is approximately 0.10~0.30 mm, the wavelength of the corrugate is approximately 2.5 to 4.5 mm, the wave height of the corrugate is approximately 1.0 to 3.0 mm, and the length of the small channels is approximately 100 to 500 mm.]

[8. A method of manufacturing a gas adsorbing element according to claim 4, wherein the sheets in said step (a) are low density papers.]

[9. A method of manufacturing a gas adsorbing element according to claim 4, wherein the inorganic fiber sheets in said step (a) are baked either before or after forming the block.]

[10. A method of manufacturing a gas adsorbing element according to claim 4, wherein the thickness of the inorganic fiber sheets is approximately 0.10~0.30 mm, the wavelength of the corrugate is approximately 2.5 to 4.5 mm, the wave height of the corrugate is approximately 1.0 to 3.0 mm, and the length of the small channels is approximately 100 to 500 mm.]

[11. A method of manufacturing a gas adsorbing element according to claim 5, wherein the inorganic fiber sheets in said step (a) are baked either before or after forming the block.]

[12. A method of manufacturing a gas adsorbing element according to claim 5, wherein the thickness of the inorganic fiber sheets is approximately 0.10~0.30 mm, the wavelength of the corrugate is approximately 2.5 to 4.5 mm, the wave height of the corrugate is approximately 1.0 to 3.0 mm, and the length of the small channels is approximately 100 to 500 mm.]

[13. A method of manufacturing a gas adsorbing element according to claim 6, wherein the thickness of the inorganic fiber sheets is approximately 0.10~0.30 mm, the wavelength of the corrugate is approximately 2.5 to 4.5 mm, the wave height of the corrugate is approximately 1.0 to 3.0 mm, and the length of the small channels is approximately 100 to 500 mm.]

[14. A method of manufacturing a gas adsorbing element, comprising the steps of:

(a) laminating sheets having a main component of inorganic fiber to obtain laminated sheets;

(b) forming the laminated sheets into a honeycomb structure having many small channels;

(c) impregnating the honeycomb structure with a dispersion of high silica zeolite powder in which a mol ratio of silica and alumina is more than approximately 8:1 and with an inorganic binder;

(d) fixing the high silica zeolite powder in fiber gaps in the honeycomb structure; and (e) baking the laminated sheets before or after forming the honeycomb shaped structure.]

*15. A gas adsorbing device according to claim 1, wherein the honeycomb-shaped laminate is a rotor.*

*16. A gas adsorbing device according to claim 15, wherein*

*the adsorbing and desorbing zones are provided in different sectors of the rotor, and*

*the device further comprises a motor to rotate the rotor so as to interchange the adsorbing and desorbing zones.*

*17. A gas adsorbing device according to claim 1, further comprising a heater to heat a reactivating gas which is passed through the desorbing zone.*

*18. A gas adsorbing device according to claim 1, wherein the honeycomb-shaped laminate simultaneously adsorbs and desorbs volatile organic compounds.*

*19. A gas adsorbing device according to claim 1, wherein*

*the honeycomb-shaped laminate is a rotor, and*

*the device further comprises:*

*a casing to rotatably support the rotor,*

*a separator to separate the adsorbing zone from the desorbing zone, and*

*a motor to rotate the rotor within the casing.*

*20. A gas adsorbing device according to claim 19, further comprising a heater to heat reactivation air supplied to the desorbing zone.*

*21. A method of adsorbing organic solvent vapor, comprising:*

*passing the organic solvent vapor over a gas adsorbing element comprising:*

*a honeycomb-shaped laminate having many small channels penetrating from a first end surface to a second end surface, including a hydrophobic high silica zeolite powder fixed on walls of said small channels, said high silica zeolite having the composition of $xM_2/_nO—Al_2O_3.ySiO_2.zH_2O$, where M is an alkaki metal or alkaline-earth metal, n is its valence, and y is a mol ratio of silica to alumina and is greater than approximately 200; and*

*desorbing the organic solvent vapor from the gas adsorbing element to thereby reactivate the gas adsorbing element.*

*22. A method of adsorbing organic solvent vapor according to claim 21, wherein*

*the honeycomb-shaped laminate has an adsorbing zone and a desorbing zone, and*

*organic solvent vapor is passed over the adsorbing zone of the gas adsorbing element at the same time as organic solvent vapor is desorbed from the desorbing zone of the gas adsorbing element.*

*23. A method of adsorbing organic solvent vapor according to claim 22, wherein the adsorbing and desorbing zones are repeatedly interchanged with one or another.*

*24. A method of adsorbing organic solvent vapor according to claim 22, wherein*

*the honeycomb-shaped laminate is rotatably supported in a casing having a separator to separate the adsorbing zone from the desorbing zone, and*

*the honeycomb-shaped laminate is rotated in the casing.*

*25. A method of adsorbing organic solvent vapor according to claim 21, wherein the organic solvent vapor is desorbed by passing a heated reactivation air through the honeycomb-shaped laminate.*

* * * * *

UNITED STATES PATENT AND TRADEMARK OFFICE

CERTIFICATE OF CORRECTION

PATENT NO. : RE 41,314 E
APPLICATION NO. : 10/374604
DATED : May 4, 2010
INVENTOR(S) : Toshimi Kuma It is certified that error appears in the above-identified patent and that said Letters Patent is hereby corrected as shown below:

On the Title Page, Item (57) (Abstract), Line 3, Change "and" to --end--.

Column 7, Line 8, Change "alkaki" to --alkali--.

Column 8, Line 62, Change "alkaki" to --alkali--.

Signed and Sealed this

Third Day of August, 2010

David J. Kappos

David J. Kappos
*Director of the United States Patent and Trademark Office*